UNITED STATES PATENT OFFICE.

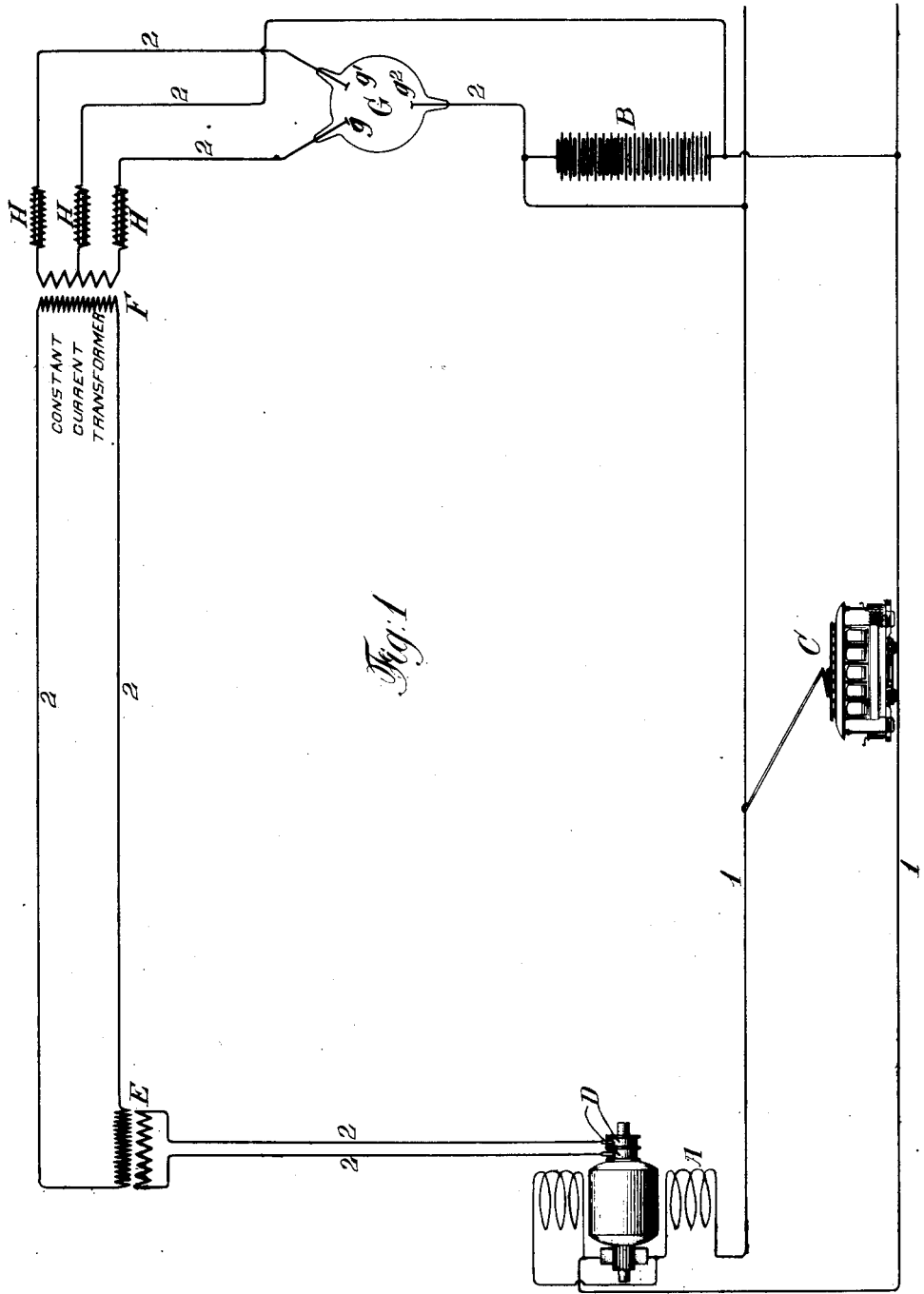

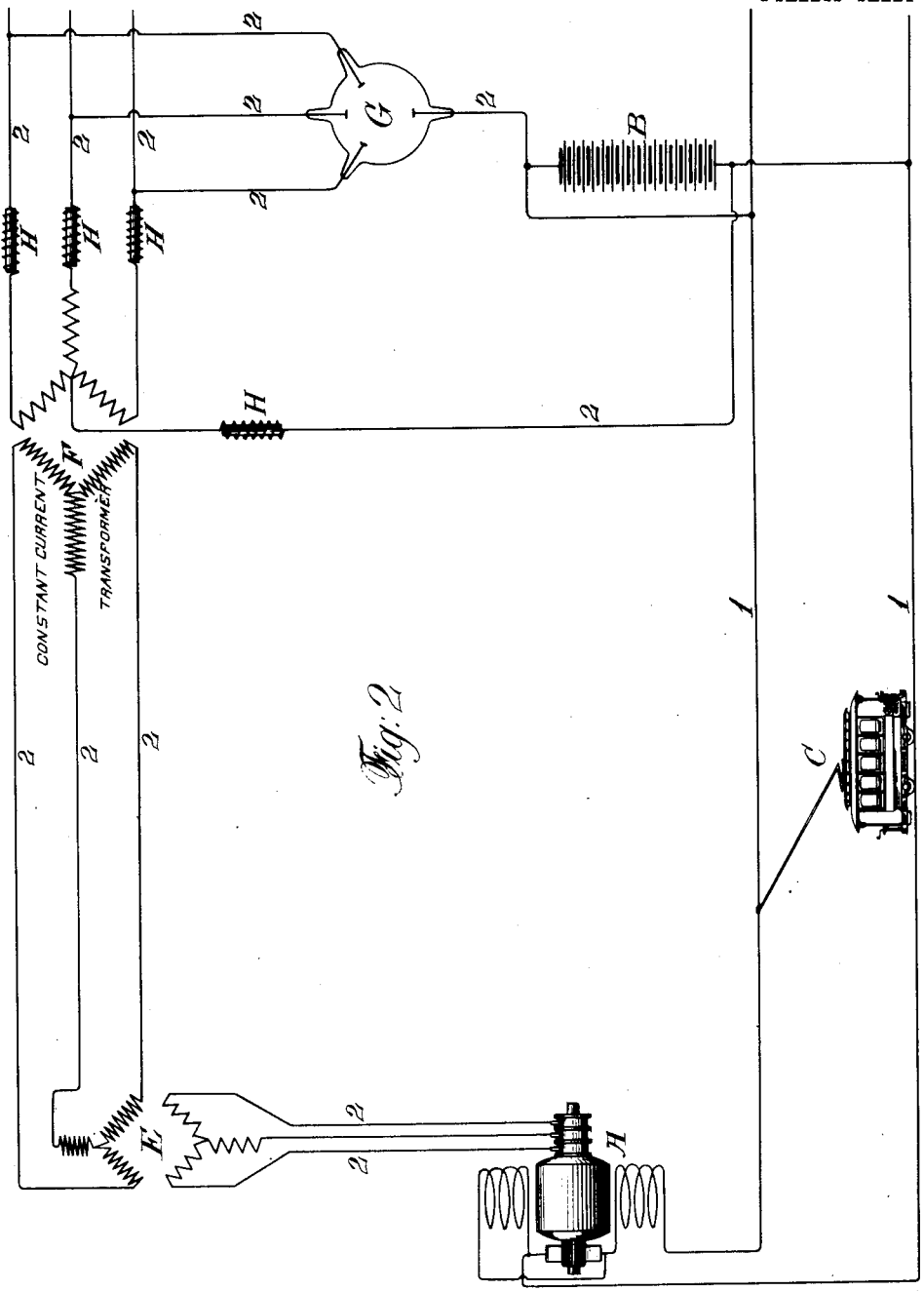

WALTER E. WINSHIP, OF NEW YORK, N. Y., ASSIGNOR TO GOULD STORAGE BATTERY COMPANY, A CORPORATION OF NEW YORK.

ELECTRICAL SYSTEM OF DISTRIBUTION.

957,530.

Specification of Letters Patent.

Patented May 10, 1910.

Application filed September 19, 1906. Serial No. 335,179.

*To all whom it may concern:*

Be it known that I, WALTER E. WINSHIP, a citizen of the United States, and a resident of New York city, county and State of New York, have invented certain new and useful Improvements in Electrical Systems of Distribution, of which the following is a specification.

My invention relates to electrical systems of distribution in which line batteries are employed, line batteries being batteries that are connected to float across the line at a substantial distance from the generating station to maintain the line voltage of such distant points more constant, and also to maintain more steady the energy transmitted from the station to such distant points. Such batteries are ordinarily employed on electric railways being located a number of miles from the generating plant. The line batteries may be either connected to the station by the same feeders that supply the intermediate portions of the railway, or the batteries may be connected to the generating station by special feeders having boosting apparatus therein, or they may be connected both by the regular and by the special feeders.

In accordance with my invention I employ an auxiliary alternating current circuit with suitable rectifying devices to connect the floating battery with the station, whereby in sending the energy over the long distance that separates the battery from the generating station relatively little energy is lost, while special boosting appliances are avoided. This independent alternating current circuit connecting the battery and the station should have a markedly drooping characteristic so that despite the fluctuations of the demand of that portion of the system to which the battery is connected the energy delivered by the alternating current circuit will not vary widely, and my invention involves the provision of a transformer having a constant current characteristic in the independent alternating current circuit, whereby the circuit is given a markedly drooping characteristic, this transformer being preferably located at the battery end of the circuit.

In order to obtain the best results the alternating current should be transformed in a step-up transformer at the station and again in a step-down transformer located at the battery, one or both of these transformers, but preferably only the latter, being the transformer having the constant current characteristic above referred to. These and other detailed features of my improvements which I will described hereinafter are included in my invention.

Referring to the drawings, Figure 1 is a diagrammatic illustration of a system embodying the various features of my invention. Fig. 2 is a similar diagram which only differs in showing the alternating current circuit as a polyphase one.

A represents the main direct current generator or generators of an electric railway station delivering direct current to the lines 1—1 of say, a trolley road.

B represents a floating line battery which is at a considerable distance from the station, this distance depending upon the character of the road, the capacity of the feeders, etc.

C indicates one of the trolley cars to illustrate that there is a work circuit between the generating station A and the battery B.

D represents collector rings connected to different portions of the winding of the generator A independently of the commutator of the machine so that the generator A will, in addition to delivering the direct current to the lines 1—1, deliver an alternating current to the circuit 2, which circuit extends from the generating system to the battery through intermediate transforming and rectifying devices. It is not essential that this alternating current circuit should be supplied by the same generator or generators as supply the direct current circuits, but it is a convenient means for supplying this current and forms a preferred feature of my invention.

E is a step-up transformer located within or adjacent to the generating station so as to increase the voltage of the alternating current circuit and so reduce losses in transformation.

F is a step-down transformer located at or near the floating battery and reducing the voltage to a suitable value relative to that which it is desired to maintain at the portion of the system where the battery is located.

G indicates diagrammatically a rectifier of the mercury type, this being preferred, though not essential, because of the absence of moving parts, thereby enabling the battery station to be operated without constant attendance.

In Fig. 1, where the alternating current circuit is shown as a single phase circuit, the secondary of the step-down transformer F is divided, the terminals of the secondary being connected to the mercury rectifier while a central point in the secondary is connected to one terminal of the battery, the other terminal of the battery is connected to the mercury rectifier. This is the usual arrangement for connecting transformers to these mercury rectifiers.

H represents choke coils in the leads between the secondary of the transformer F and battery and rectifier in order to make the rectified current less pulsating than it would otherwise be.

With the arrangement above described a substantially constant current, but with small energy losses, will be delivered over the independent alternating current circuit 2 to the part of the system at which the battery is located. If the demands of the system at this point are substantially equal to this current then the battery will float across the line neither delivering nor receiving energy. When the demands of this part of the system increase the voltage will fall, but as the battery should have less of a drooping characteristic than that given to the circuit 2, the increased demand will be met by a discharge of the battery and a relatively slight increase of current over the alternating current circuit. When the demand of this portion of the system falls below the average current delivered over the alternating current circuit, then a portion of the energy of the alternating current circuit will be employed in charging the battery. When the battery is directly connected to the direct current end of the generator through the lines 1—1, as shown, the operation will be slightly modified by variations of load on portions of the system intermediate to the battery and the generator, but the general mode of operation is substantially the same.

It will be understood that the details of my invention may be widely varied in manners well known to those skilled in the art without departing from the scope of my invention as set forth in the appended claims.

Having thus described my invention, what I claim as new and desire to secure by Letters Patent, is:—

1. In an electrical system of distribution, a floating battery distant from the station, a working circuit between the station and the battery and connected to the station, an alternating current source of supply at the station, an independent circuit transmitting energy from said alternating current source to the part of the system to which the battery is connected, and a transformer therein having a constant current characteristic.

2. In an electric railway system, a direct current generating station, a floating battery distant from the station, a working circuit between the station and the battery and connected to the direct current generator, an alternating current source of supply at the station, an independent circuit transmitting energy from said alternating current source to the part of the system to which the battery is connected, and a transformer therein having a constant current characteristic.

3. In an electrical system of distribution, a floating battery distant from the station, a working circuit between the station and the battery and connected to the station, an alternating current source of supply at the station, a rectifying device adjacent to the battery, an independent circuit transmitting energy from said alternating current source through the rectifying device to the part of the system to which the battery is connected, and a transformer having a constant current characteristic in said independent circuit.

4. In an electric railway system, a direct current generating station, a floating battery distant from the station, a working circuit between the station and the battery and connected to the direct current generator, an alternating current source of supply at the station, a rectifying device adjacent to the battery, an independent circuit transmitting energy from said alternating current source through the rectifying device to the part of the system to which the battery is connected, and a transformer having a constant current characteristic in said independent circuit.

5. In an electrical system of distribution, a direct current generating station, a floating battery distant from the station, a working circuit between the station and the battery and connected to the direct current generator and to the battery, an alternating current source of supply at the station, an independent circuit transmitting energy from said alternating current source to the part of the system to which the battery is connected, and a transformer having a constant current characteristic in said independent circuit.

6. In an electrical system of distribution, a direct current generating station, a floating battery distant from the station, a working circuit between the station and the battery and connected to the direct current generator and to the battery, an alternating current source of supply at the station, a rectifying device adjacent to the battery, an independent circuit transmitting energy from said alternating current source through the rectifying device to the part of the system to which the battery is connected, and a transformer having a constant current characteristic in said independent circuit.

7. In an electric railway system, a direct current generator, a battery distant therefrom, a work circuit between generator and battery, an alternating current circuit supplied by the windings of said direct current generator and delivering energy to the part of the system at which the battery is located, and a transformer having a constant current characteristic in said alternating current circuit.

8. A generating station, a battery distant from the station, a work circuit intermediate the station and battery, a separate circuit extending from the station to the battery, and means for giving said circuit a relatively great drooping characteristic.

9. In an electrical system of distribution the combination of a work circuit, a direct current source of supply connected thereto, a battery arranged in operative relation with said work circuit, an alternating current circuit and its source of supply, a converting apparatus connected between the alternating current circuit and the direct current circuit, and automatic electroresponsive means for causing said alternating current circuit to supply a substantially constant current to the battery or the direct current side of the system.

10. A generating station having direct current and alternating current sources, a battery distant from the station, a work circuit between the battery and station connected to the latter, an alternating current circuit from the station to the point of battery location, a step-up transformer at the station in said alternating current circuit, a step-down transformer at the battery in said circuit, and a mercury rectifier connected to the step-down transformer and to the battery.

11. A generating station having direct current and alternating current sources, a battery distant from the station, a work circuit between the battery and station connected to the latter, an alternating current circuit from the station to the point of battery location, a step-up transformer at the station in said alternating current circuit, a step-down transformer having a constant current characteristic at the battery in said circuit, a mercury rectifier connected to the step-down transformer and to the battery, and choke coils in the circuit of the mercury rectifier.

12. In an electric railway system, a direct current generating station, a floating battery distant from the station, a working circuit between the station and the battery and connected to the direct current generator, an alternating current source of supply at the station, a mercury rectifier at the battery and connected to the alternating current source of supply, and means for giving the alternating current circuit a markedly drooping characteristic at the rectified end of the circuit.

In testimony whereof, I have signed my name to this specification, in the presence of two subscribing witnesses.

WALTER E. WINSHIP.

Witnesses:
   Edwin Seger,
   Anna Daly.